United States Patent
Yang

(10) Patent No.: US 10,896,354 B2
(45) Date of Patent: Jan. 19, 2021

(54) TARGET DETECTION METHOD AND DEVICE, COMPUTING DEVICE AND READABLE STORAGE MEDIUM

(71) Applicant: BOE TECHNOLOGY GROUP CO., LTD., Beijing (CN)

(72) Inventor: Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 199 days.

(21) Appl. No.: 16/141,637

(22) Filed: Sep. 25, 2018

(65) Prior Publication Data
US 2019/0303731 A1   Oct. 3, 2019

(30) Foreign Application Priority Data
Mar. 28, 2018   (CN) .......................... 2018 1 0267167

(51) Int. Cl.
*G06K 9/62* (2006.01)
*G06K 9/66* (2006.01)
*G06N 3/04* (2006.01)
*G06N 3/08* (2006.01)

(52) U.S. Cl.
CPC .............. *G06K 9/6293* (2013.01); *G06K 9/66* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2019/0259174 A1* | 8/2019 | De Villers-Sidani | G06K 9/6271 |
| 2019/0370965 A1* | 12/2019 | Lay | G06N 20/00 |
| 2020/0145661 A1* | 5/2020 | Jeon | H04N 19/61 |
| 2020/0167161 A1* | 5/2020 | Planche | G06T 7/50 |

* cited by examiner

*Primary Examiner* — Fayyaz Alam
(74) *Attorney, Agent, or Firm* — Thomas | Horstemeyer, LLP

(57) ABSTRACT

The present disclosure relates to a target detection method and device, a computing device and a readable storage medium. The target detection method include performing target detection using a convolutional neural network comprising a plurality of convolutional layers. The method include performing a branch convolutional process on at least one of the convolutional layers to obtain a branch detection result. The method includes performing a fusion process on the branch detection result, or on the branch detection result and a detection result of a last convolutional layer in the convolutional neural network, and transmitting a result of the fusion process to a fully connected layer.

17 Claims, 7 Drawing Sheets

---

Perform target detection using a CNN including a plurality of convolutional layers — S110

Perform a branch convolutional process on at least one of the convolutional layers to obtain a branch detection result — S120

Perform a fusion process on the branch detection result, or perform a fusion process on the branch detection result and a detection result of the last convolutional layer in the convolutional neural network, and transmit a result of the fusion process to a fully connected layer — S130

TARGET DETECTION METHOD AND DEVICE, COMPUTING DEVICE AND READABLE STORAGE MEDIUM

CROSS-REFERENCE TO RELATED APPLICATIONS

This application claims priority to Chinese Patent Application 201810267167.2, filed Mar. 28, 2018, the entire contents of which are incorporated herein by reference.

TECHNICAL FIELD

The present disclosure relates to, but is not limited to, image processing technologies, and particularly to a target detection method and method, a computing device and a computer readable storage medium.

BACKGROUND

With the development of image processing technologies, image processing technologies have been applied to target detection. In practical applications, pedestrian-oriented detection has high application value.
Convolutional Neural Network (CNN) has shown great advantages in the field of image processing, especially in the detection and recognition of targets. In the target detection of images, pedestrians are the most common targets having practical significance.

SUMMARY

Arrangements of the present disclosure provide a target detection method and device, a computing device and a readable storage medium.
An arrangement of the present disclosure provides a target detection method
The method includes
performing target detection using a convolutional neural network including a plurality of convolutional layers. The method includes
performing a branch convolutional process on at least one of the convolutional layers to obtain a branch detection result. The method includes
performing a fusion process on the branch detection result, or performing a fusion process on the branch detection result and a detection result of the last convolutional layer in the convolutional neural network, and transmitting a result of the fusion process to a fully connected layer.

According to an exemplary arrangement, in the above target detection method, performing a branch convolutional process on at least one of the convolutional layers, includes performing one or more parallel branch convolutional processes on each convolutional layer on which the branch convolutional process is performed. The numbers of branch convolutional processes for different convolutional layers are the same or different
Sizes of convolution kernels used in the branch convolutional processes for different convolutional layers are the same or different, and sizes of the convolution kernels used when performing multiple parallel branch convolutional processes on the same convolutional layer are the same or different.

According to an exemplary arrangement, in the above target detection method, the convolutional layer on which the branch convolutional process is performed includes the last convolutional layer in the convolutional neural network.

Performing a fusion process includes
performing the fusion process on each branch detection result of each convolutional layer on which the branch convolutional process is performed.

According to an exemplary arrangement, in the above target detection method, the convolutional layer on which the branch convolutional process is performed dose not include the last convolutional layer in the convolutional neural network.
Performing a fusion process includes
performing the fusion process on each branch detection result of each convolutional layer on which the branch convolutional process is performed and the detection result of the last convolutional layer in the convolutional neural network.

According to an exemplary arrangement, in the above target detection method, the convolutional neural network further includes a plurality of pooling layers which are disposed after different convolutional layers and are spaced from each other.

According to an exemplary arrangement, in the above target detection method, performing a branch convolutional process on at least one of the convolutional layers includes performing the branch convolutional process on at least one of the convolutional layers using a convolution kernel of n*m, where n<m, n and m are positive integers.

According to an exemplary arrangement, in the above target detection method, the convolutional neural network is a VGG network.

According to an exemplary arrangement, in the above target detection method, the VGG network is configured as a 16-layer VGG-16.
Performing a branch convolutional process on at least one of the convolutional layers includes
performing two parallel branch convolutional processes on the seventh, the tenth, and the thirteenth convolutional layers in the VGG-16, respectively. The convolution kernels used in the two parallel branch convolutional processes on the seventh, the tenth, and the thirteenth convolutional layers are 3*5 and 5*7, respectively.

Another arrangement of the present disclosure provides a target detection device. The target detection device includes a target detection module configured to perform target detection using a convolutional neural network including a plurality of convolutional layers. The target detection device includes
a branch convolutional module configured to perform a branch convolutional process on at least one of the convolutional layers to obtain a branch detection result. The target detection device includes
a fusion process module performing a fusion process on the branch detection result, or performing a fusion process on the branch detection result and a detection result of the last convolutional layer in the convolutional neural network. The target detection device includes a transmission module configured to transmit a result of the fusion process to a fully connected layer.

According to an exemplary arrangement, in the above target detection device, performing by the branch convolutional module a branch convolutional process on at least one of the convolutional layers includes
performing one or more parallel branch convolutional processes on each convolutional layer on which the branch convolutional process is performed The numbers of branch convolutional processes for different convolutional layers are the same or different.

Sizes of convolution kernels used in the branch convolutional processes for different convolutional layers are the same or different, and sizes of the convolution kernels used when performing multiple parallel branch convolutional processes on the same convolutional layer are the same or different.

According to an exemplary arrangement, in the above target detection device, the convolutional layer on which the branch convolutional process is performed by the branch convolutional module includes the last convolutional layer in the convolutional neural network.

Performing a fusion process by the fusion process module includes:

performing the fusion process on each branch detection result of each convolutional layer on which the branch convolutional process is performed.

According to an exemplary arrangement, in the above target detection device, the convolutional layer on which the branch convolutional process is performed by the branch convolutional module dose not include the last convolutional layer in the convolutional neural network.

Performing a fusion process by the fusion module includes:
performing the fusion process on each branch detection result of each convolutional layer on which the branch convolutional process is performed and the detection result of the last convolutional layer in the convolutional neural network.

According to an exemplary arrangement, in the above target detection device, the convolutional neural network further includes a plurality of pooling layers which are disposed after different convolutional layers and are spaced from each other.

According to an exemplary arrangement, the above target detection device further includes
an input module configured to input an original image on which a target detection is to be performed. The target detection device includes
an output module configured to output a target detection result which is processed by the fully connected layer.

According to an exemplary arrangement, in the above target detection device, performing by the branch convolutional module a branch convolutional process on at least one of the convolutional layers includes
performing the branch convolutional process on at least one of the convolutional layers using a convolution kernel of n*m, where n<m, n and m are positive integers.

An arrangement of the present disclosure provides a computing device. The computing device includes
a memory for storing executable instructions; and
a processor that can execute the executable instructions stored in the memory to implement the target detection method as described.

An arrangement of the present disclosure provides a computer readable storage medium having executable instructions stored therein. The executable instructions are executed by a processor to implement the target detection method as described.

BRIEF DESCRIPTION OF THE DRAWINGS

The drawings are used to provide a further understanding of the technical solutions of the present disclosure, and constitute a part of the specification, and are used to explain the technical solutions of the present disclosure together with the arrangements of the present application, and do not constitute a limitation of the technical solutions of the present disclosure.

DETAILED DESCRIPTION

To make the objectives, technical solutions and advantages of the present disclosure more clear, arrangements of the present disclosure will be described in detail below with reference to the accompanying drawings. It should be noted that, arrangements and the features in the arrangements of the present disclosure may be arbitrarily combined with each other, if the arrangements and the features in the arrangements are not contrary to each other.

Arrangements described below may be combined with each other, and descriptions regarding the same or similar concepts or procedures will not be repeated.

In related arts, the processing speed of the CNN-based pedestrian detection is slow. Currently, compared with other CNN-based algorithms, yolo algorithm has obvious advantages in the term of real-time performance; however, the yolo algorithm does not take pedestrians as a particular target, especially in cases where there are multiple pedestrians and each of the targets is small. The effect of detecting pedestrians by the yolo algorithm is poor.

Figure 1:
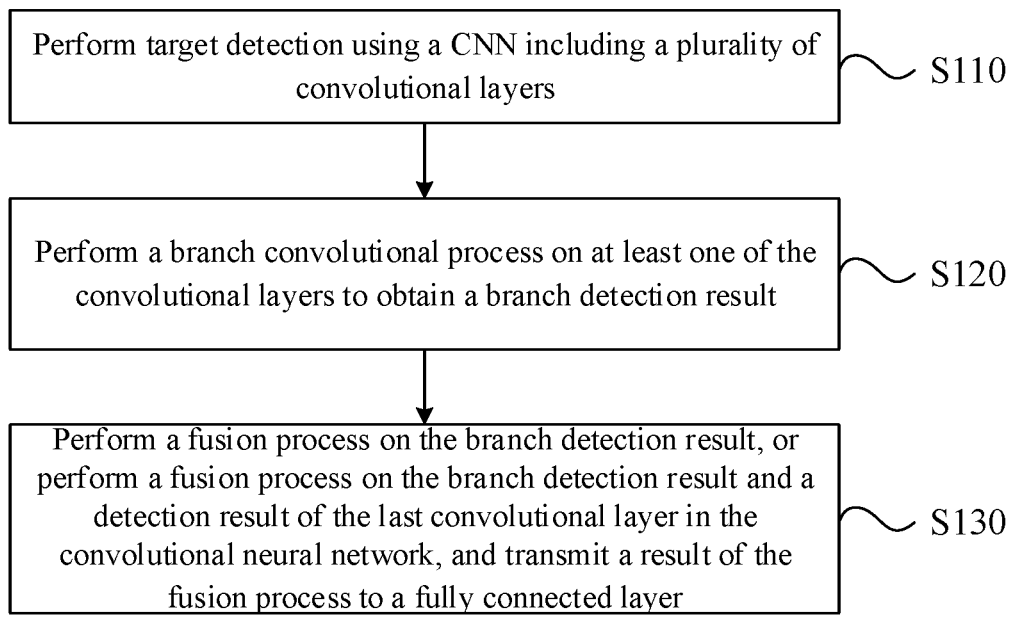
FIG. 1 is a flowchart of a target detection method according to an arrangement of the present disclosure.

Aiming at the above problem, arrangements of the present disclosure provide target detection method and device. FIG. 1 is a flowchart of a target detection method according to an arrangement of the present disclosure. The target detection method provided by the arrangement of the present disclosure may include the following:

In S110, target detection is performed using a CNN including a plurality of convolutional layers.

In S120, a branch convolutional process is performed on at least one of the convolutional layers to obtain a branch detection result.

The target detection method provided by the arrangement of the present disclosure is a CNN-based target detection method. That is, based on the layer structure of the CNN, algorithm processes are performed to achieve target detection. The CNN usually includes a plurality of convolutional layers (CONV layers), which are core layers in the CNN structure for detecting and processing input image data. Each convolutional layer, according to a convolution kernel of a fixed-size, performs convolution calculations on the image data which is input to the current convolutional layer, and the result of the convolution calculations is transmitted to the next convolutional layer.

Figure 2:
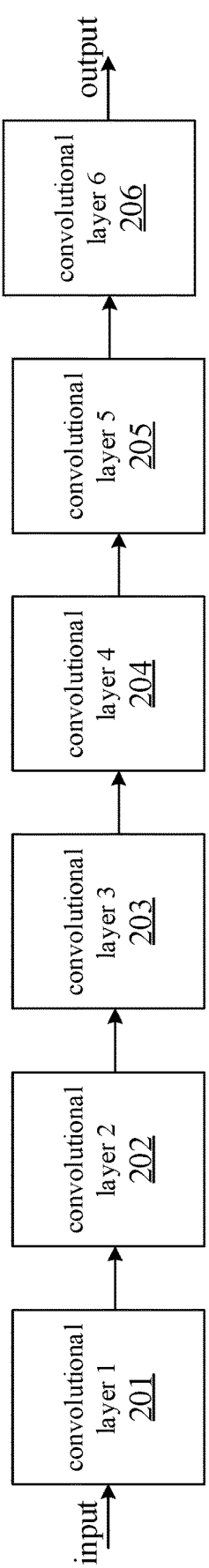
FIG. 2 is a schematic diagram of a method for processing a convolutional layer in a CNN in related art.

It should be noted that the hierarchical relationship of multiple convolutional layers in the CNN is usually a sequential relationship. For example, in the process of image processing in these convolutional layers, the first convolutional layer performs convolutional calculations on the input image data and transmits the processed data to the second convolutional layer. The second convolutional layer performs convolutional calculations on the received image data, and outputs the processed data to the third convolutional layer, and so on. The processes of the image data by the convolutional layers may be deemed as trunk processes, that is each convolutional layer performs the convolutional calculation on the image data only once. FIG. 2 is a schematic diagram of a method for processing a convolutional layer in a CNN in related art. FIG. 2 only shows six convolutional layers (201, 202, 203, 204, 205, and 206) and does not show other layers in CNN. The six convolutional layers 201-206 are arranged in sequence, and the convolutional processes are performed according to the arrangement order of the layers.

In the arrangement of the present disclosure, based on the target detection by the CNN, that is, on the basis of the trunk processes, one or more convolutional layers may be selected from the plurality of convolutional layers in the CNN, and a branch convolutional process may be performed on the selected one or more convolutional layers.

Figure 3:
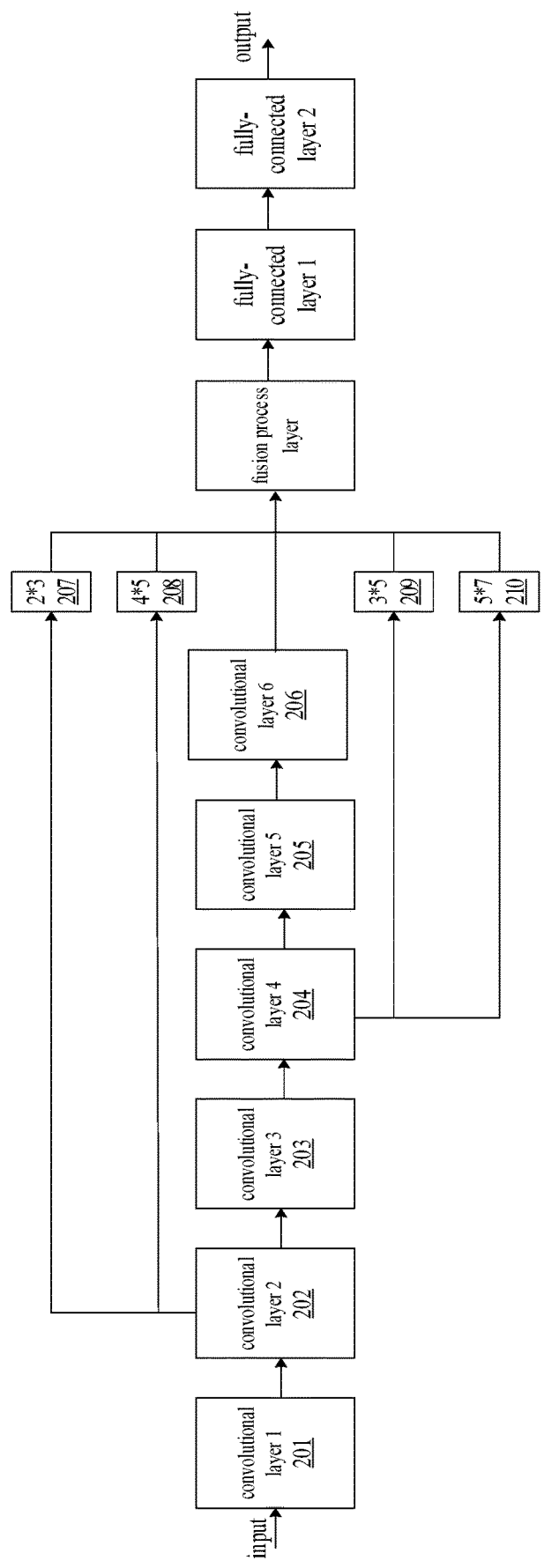
FIG. 3 is a schematic diagram of a method for processing a convolutional layer in a target detection method according to an arrangement of the present disclosure.

FIG. 3 is a schematic diagram of a method for processing a convolutional layer in a target detection method according to an arrangement of the present disclosure. Based on the processes of the convolutional layers as shown in FIG. 2, for example, branch convolutional processes 207/208 and 209/210 are performed on the second and fourth convolutional layers, respectively, as shown in FIG. 3. As can be seen from FIG. 3, the convolutional calculations performed in turn for individual convolutional layers are regarded as the trunk processes, and the branch convolutional processes refer to that branch processes are added based on the trunk processes. As shown in FIG. 3, branch processes are performed on the second and fourth convolutional layers. In addition, the trunk processes generate only one result, that is, the detection result output by the last layer of the convolutional layers (the sixth convolutional layer in FIG. 3). The branch processes output a plurality of results. For example, the branch convolutional processes are performed on the two convolutional layers in FIG. 3, and if two parallel branch convolutional processes are performed on each of the two convolutional processes, four branch detection results are output, as shown in FIG. 3.

It should be noted that if the branch detection process is not performed on the last convolutional layer (e.g., the sixth layer in FIG. 3) in the CNN, the sixth convolutional layer still outputs the detection result of the trunk process; if the branch detection process is performed on the last convolutional layer in the CNN, only the branch detection result is output and the detection result of the trunk process of the six layer is no longer output.

Figure 4:
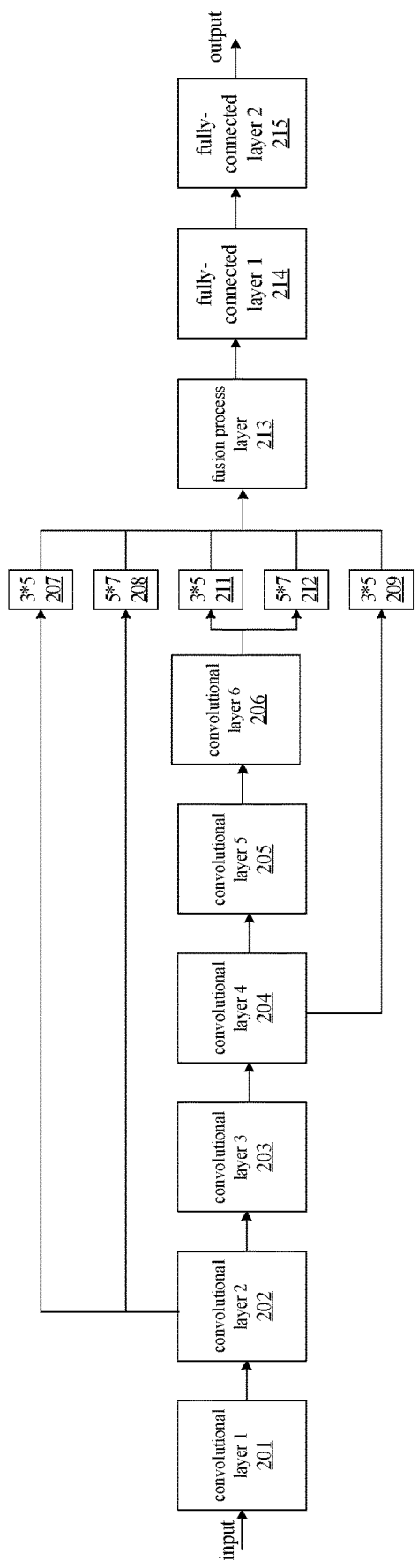
FIG. 4 is a schematic diagram of a method for processing a convolutional layer in a target detection method according to an arrangement of the present disclosure.
Figure 5:
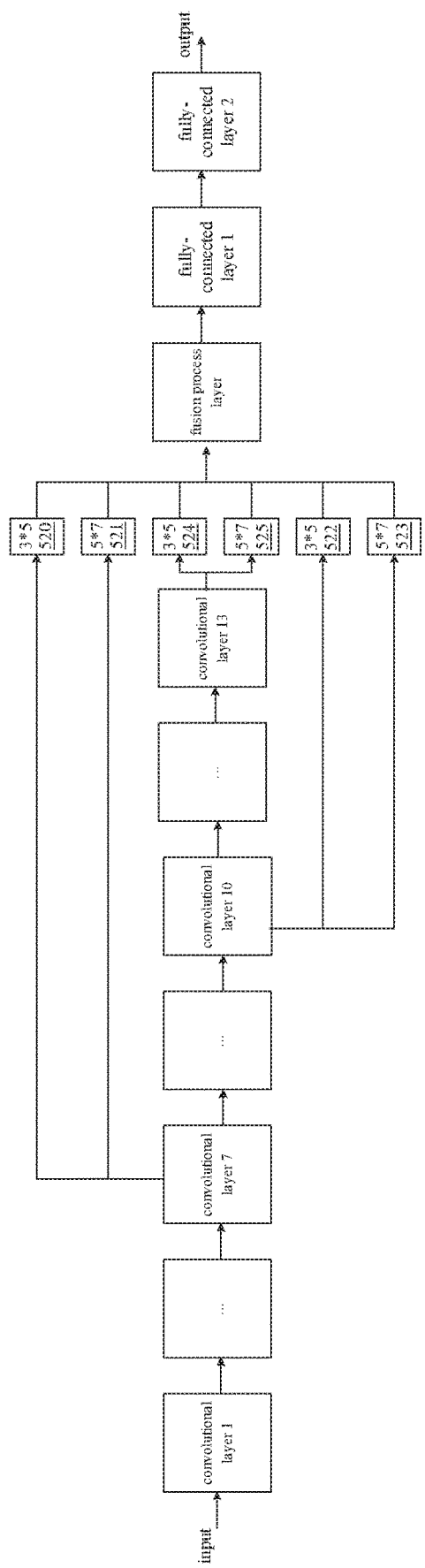
FIG. 5 is a schematic diagram of a method for processing a convolutional layer in a target detection method according to an arrangement of the present disclosure.

FIG. 4 is a schematic diagram of a method for processing a convolutional layer in a target detection method according to an arrangement of the present disclosure. The network structure of CNN shown in FIG. 4 is the same as that in FIG. 3, except that the second, fourth, and sixth (last layer) convolutional layers in FIG. 4 are subject to the branch convolutional processes 211 and 212, and under such condition, the sixth convolutional layer outputs only the branch detection result. In addition, in the processes shown in FIG. 3 and FIG. 4, the detection results including the branch processes are fused by a fusion process layer 213, and then transmitted to one or more fully connected layers 214 and 215. FIGS. 3-5 shows two fully connected layers; however, this does not mean that the CNN in arrangements of the present disclosure necessarily includes two fully connected layers.

Referring again to FIG. 1, in S130, a fusion process is performed on the branch detection result, or a fusion process is performed on the branch detection result and a detection result of the last convolutional layer in the CNN, and a result of the fusion process is transmitted to a fully connected layer.

In the processes of the convolutional layers in the CNN in related art as shown in FIG. 2, all convolutional layers output only one detection result, that is, the detection result generated by the convolution calculation of the last convolutional layer, so this detection result is directly transmitted to the fully connected layer. In the arrangement of the present disclosure, a plurality of branch detection results can be obtained, and alternatively, one or more branch detection results and the detection result of the trunk processes may be acquired, and therefore, the fusion process is performed on multiple branch detection results or on at least one branch detection result and the detection result of the trunk processes. In this case, the detection results may be fused. The fusion process refers to scaling multiple images of different sizes into uniform sizes. Therefore, the information of images can be integrated for target detection, and then the image data obtained after the fusion process is transmitted to the fully connected layer.

As described above, whether the branch detection process is performed on the last convolutional layer in the CNN determines the number and contents of the detection results output by the CNN. Optionally, the convolutional layer on which the branch convolutional process is performed includes the last convolutional layer in the CNN, and the last convolutional layer only outputs the branch detection result, and no longer outputs the detection result of the trunk processes. Under such condition, the fusion process may include: performing the fusion process on each branch detection result of each convolutional layer on which the branch convolutional process is performed. Optionally, the convolutional layer on which the branch convolutional process is performed does not include the last convolutional layer in the CNN, and the last layer convolutional layer still outputs the detection result of the trunk processes. Under such condition, the fusion process includes: performing the fusion process on each branch detection result of each convolutional layer on which the branch convolutional process is performed and the detection result of the last convolutional layer in the CNN.

The processes of the convolutional layers in CNN in related art is as shown in FIG. 2, and there only exist the trunk processes. For example, in the CNN-based yolo algorithm, the yolo algorithm divides the entire image into grids of a fixed size (for example, 7*7, 3*3) in order to increase the speed, and two potential detection windows are obtained in each grid. The yolo algorithm is an end-to-end network model, image data is directly input, and the output is the detection result. The yolo algorithm maintains good detection accuracy, while having a fast detection speed. However, since the model of the yoo algorithm adopts a fixed network partitioning method, the detection accuracy for a small target (such as a pedestrian) is insufficient, and in the application scenario of pedestrian detection, the target tends to be relatively small in the image. Therefore, the yolo algorithm is difficult to detect small targets.

In view of the problem that the processing speed is slow and the small target is difficult to detect in the pedestrian detection in the existing CNN, arrangements of the present disclosure establishes a branch of the convolutional layers on the basis of the existing convolutional layers based on the VGG network architecture. That is, multiple branch detection results are obtained. Before transmitting the image data to the fully connected layer, the fusion processes is performed on the plurality of detection results (including at least one branch detection result and the detection result of the trunk processes, or including a plurality of branch detection results). That is, the obtained detection results include detection information of different scales, which makes the target detection method more applicable and can be applied to the target detection method for small targets.

In the target detection methods provided by the arrangements of the present disclosure, during the target detection using the CNN, a branch detection result is obtained by performing a branch convolutional process on at least one convolutional layer in the CNN, and a fusion process is performed on the branch detection result, or a fusion process is performed on the branch detection result and the detection result of the last convolutional layer in the CNN, and the result after the fusion process is transmitted to the fully connected layer. By the addition of the branch convolutional process(es), the convolutional process in the traditional CNN that includes only the trunk process is changed to the combination of the trunk process and the branch process, that is, the detection information of individual branches is added to the target detection. The target detection method provided by the arrangements of the present disclosure, based on the VGG network architecture, establishes the branches of the convolution layers on the basis of the existing convolutional layers, which makes the applicability of the target detection method more extensive, and solves the technical problem that the processing speed in the CNN-based pedestrian detection is low and it is hard to detect small targets.

Optionally, in an arrangement of the present disclosure, performing a branch convolutional process on at least one of the convolutional layers in S120 may include:

performing one or more parallel branch convolutional processes on each convolutional layer on which the branch convolutional process is performed. The numbers of branch convolutional processes for different convolutional layers are the same or different.

In the arrangement of the present disclosure, one or more parallel branch convolutional processes may be performed on one convolutional layer, or one or more parallel branch convolutional processes may be performed on multiple convolutional layers, or one branch convolutional process is performed on a part of the convolutional layers, and multiple parallel branch convolutional processes are performed on the other part of the convolutional layers. In a specific implementation, which convolutional layers in the CNN are selected as the layers subjected to the branch convolutional process(es), and which selected convolutional layer(s) is(are) subjected to one branch convolutional process, which selected convolutional layer(s) is(are) subjected to multiple parallel processes, can be configured by the designer. For example, in the processing mode shown in FIG. 3, the second and fourth convolutional layers are subjected to the branch convolutional processes, and each of the second and fourth convolutional layers is subjected to two parallel processes. For example, in the processing mode shown in FIG. 4, the second, fourth, and sixth convolutional layers are subjected to the branch convolutional processes, and one branch convolutional process is performed on the fourth convolutional layer, and two parallel branch convolutional processes are performed on the second and sixth convolutional layers.

In practical applications, sizes of convolution kernels used in the branch convolutional processes for different convolutional layers are the same or different, and sizes of the convolution kernels used when performing multiple parallel branch convolutional processes on the same convolutional layer are the same or different. In the arrangement of the present disclosure, the size of the convolution kernel used in each branch convolutional process may be configured by a designer according to actual conditions. For example, in the processing method shown in FIG. 3, the convolution kernels used in the two branch processes for the second convolutional layer are 2*3 and 4*5, respectively, and the convolution kernels used in the two branch processes for the fourth convolutional layer are 3*5 and 5*7, respectively. For example, in the processing method shown in FIG. 4, the convolution kernels used in the two branch processes for the second and sixth convolutional layers are 3*5 and 5*7, respectively, and the convolution kernels used in the one branch process for the fourth convolutional layer is 3*5 and 5*7.

Optionally, in the arrangement of the present disclosure, performing the branch convolutional process on the at least one convolutional layer in S120 may include: performing the branch convolutional process on at least one of the convolutional layers using a convolution kernel of n*m. It has been explained in the above arrangements that the size of the convolution kernel is configurable when the branch convolutional process is performed. If the target detection is required for the pedestrian, in the convolution kernel n*m that can be configured, n<m, n and m are positive integers. Such configuration is more in line with the detection size of pedestrians.

The sizes of the convolution kernels as described above are provided. In the arrangements of the present disclosure, the dividing of the grids when the convolutional processes are performed is improved for pedestrians (pedestrians are particular targets). That is, the sizes of the convolution kernels are no longer fixed as in the conventional mode, which makes the target detection method more suitable for detecting pedestrians.

It should be noted that the CNN includes not only multiple convolutional layers but also multiple pooling layers, which are arranged after different convolutional layers and are spaced from each other. For example, in the processing modes as shown in FIG. 3 and FIG. 4, a pooling layer may be provided after each of the third, fifth, and sixth layers (the pooling layers are not shown in the figure), and the pooling layers are spaced apart in the middle of the continuous convolutional layers, and are mainly used for compressing image data. Therefore, when performing the branch convolutional processes on multiple convolutional layers in the arrangements of the present disclosure, the plurality of convolutional layers that are usually selected are located between different pooling layers in the CNN, that is, multi-scale branches are added in the target detection, and different convolutional layers perform multi-scale detection. That is, the convolutional layers on which the branch convolutional processes are performed have different resolutions, and detection can be performed separately for targets of different sizes. In addition, in branches of different scales, the sizes of the convolution kernels can be configured according to different targets detected. That is, through multiple grids of different scales, the application range of the target detection method is further improved.

Optionally, in the arrangements of the present disclosure, the CNN may be a VGG network. The configuration of the VGG network is as shown in Table 1 below. There are six configurations (i.e., configuration A to configuration E). The convolutional layers, the pooling layers and the fully connected layers for each configured are listed in detail in Table 1.

| configurations of convolutional network | | | | | |
|---|---|---|---|---|---|
| A | A-LRN | B | C | D | E |
| 11 layers | 11 layers | 13 layers | 16 layers | 16 layers | 19 layers |
| input (224*224 RGB image) | | | | | |
| conv3-64 | conv3-64 LRN | conv3-64 conv3-64 | conv3-64 conv3-64 | conv3-64 conv3-64 | conv3-64 conv3-64 |
| pooling layer | | | | | |
| conv3-128 | conv3-128 | conv3-128 conv3-128 | conv3-128 conv3-128 | conv3-128 conv3-128 | conv3-128 conv3-128 |
| pooling layer | | | | | |
| conv3-256 | conv3-256 conv3-256 | conv3-256 conv3-256 | conv3-256 conv3-256 conv1-256 | conv3-256 conv3-256 conv3-256 | conv3-256 conv3-256 conv3-256 conv3-256 |
| pooling layer | | | | | |
| conv3-512 conv3-512 | conv3-512 conv3-512 | conv3-512 conv3-512 | conv3-512 conv3-512 conv1-512 | conv3-512 conv3-512 conv3-512 | conv3-512 conv3-512 conv3-512 conv3-512 |
| pooling layer | | | | | |
| conv3-512 conv3-512 | conv3-512 conv3-512 | conv3-512 conv3-512 | conv3-512 conv3-512 conv1-512 | conv3-512 conv3-512 conv3-512 | conv3-512 conv3-512 conv3-512 conv3-512 |
| pooling layer | | | | | |
| fully connected layer (FC-4096) | | | | | |
| fully connected layer (FC-4096) | | | | | |
| fully connected layer (FC-1000) | | | | | |
| Classification layer (soft-max) | | | | | |

Table 1 above lists six configurations of the VGG network architecture. The LRN is a local response normalization layer, which is a configuration of the VGG network, that is, the above A-LRN. The "conv3-256" means that the convolution kernel is 3*3 and the depth is 256. In the VGG network, there are three fully connected layers and one classification layer after the convolutional layer. The VGG network architecture is taken as an example to describe the implementations of the target detection methods provided by the arrangements of the present disclosure.

FIG. 5 is a schematic diagram of a method for processing a convolutional layer in a target detection method according to an arrangement of the present disclosure. In FIG. 5, a configuration D in the VGG network is taken as an example. The configuration D is a 16-layer configuration (including 13 convolutional layers, e.g., 501, 507, and 510, and 513, and 3 fully connected layers 514, 515, and 516), hereinafter referred to as VGG-16.

In this example, performing the branch convolutional process on at least one convolutional layer may include performing two parallel branch convolutional processes on the seventh, the tenth, and the thirteenth convolutional layers in the VGG-16, respectively. The convolution kernels used in the two parallel branch convolutional processes 520/521, 522/523, and 524/525 on the seventh, the tenth, and the thirteenth convolutional layers are 3*5 and 5*7, respectively. In the processing mode shown in FIG. 5, VGG-16 is used as the main frame of the network, and the first 13 convolutional layers of VGG-16 are used as the backbone of the network, and network branches are established in different convolutional layers, that is, the branch convolutional process is performed at the 7th, 10th and 13th convolutional layers to add multi-scale branches. And, the 3 layers are between different pooling layers and have different resolutions, so that it is possible to separately detect targets with different sizes, and thus to achieve the purpose of multi-scale detection. In addition, for the shape characteristics of pedestrians, the two grid-dividing methods of 3*5 and 5*7 are adopted, and the detection results of different branches are integrated through the fusion process, and finally transmitted to the fully connected layer to obtain the final result of the target detection.

It should be noted that the processes shown in FIG. 5 are provided to provide exemplary implementations of the target detection methods provided by the arrangements of the present disclosure by using the network architecture of the VGG-16 as an example, and the target detection method is not limited to that the branch convolutional process is only performed on the 7th, 10th, and the 13th convolutional layers, and it is not necessary to perform the processes by the three fully connected layers after the fusion process.

It should be noted that, in the process modes shown in FIG. 3 to FIG. 5 of the present disclosure, which convolutional layers in the CNN are subjected to the branch convolutional process, the size of the convolution kernel used in the branch convolutional process, and the specific configuration selected in the VGG network and the specific manner of implementing the target detection method in the selected configuration are illustrative.

Based on the target detection methods provided by arrangements of the present disclosure, arrangements of the present disclosure also provide target detection devices, which are configured to implement the target detection method according to any one of the above arrangements.

Figure 6:
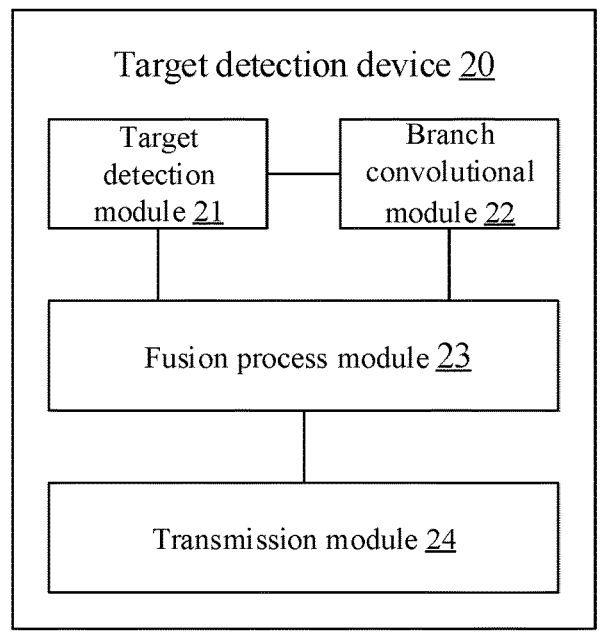
FIG. 6 is a schematic structural diagram of a target detection device according to an arrangement of the present disclosure.

FIG. 6 is a schematic structural diagram of a target detection device according to an arrangement of the present disclosure. The target detection device 20 provided by the arrangement may include a target detection module 21, a branch convolutional module 22, a fusion process module 23 and a transmission module 24.

The target detection module 21 is configured to perform target detection using a CNN including a plurality of convolutional layers.

The branch convolutional module 22 is configured to perform a branch convolutional process on at least one of the convolutional layers to obtain a branch detection result.

The target detection device provided by the arrangement of the present disclosure is a CNN-based target detection method. That is, based on the layer structure of the CNN, algorithm processes are performed to achieve target detection. The CNN usually includes a plurality of convolutional layers (CONV layers), which are core layers in the CNN structure for detecting and processing input image data. Each convolutional layer, according to a convolution kernel of a fixed-size, performs convolution calculations on the image data which is input to the current convolutional layer, and the result of the convolution calculations is transmitted to the next convolutional layer.

It should be noted that the hierarchical relationship of multiple convolutional layers in the CNN is usually a sequential relationship. For example, in the process of image processing in these convolutional layers, the first convolutional layer performs convolutional calculations on the input image data and transmits the processed data to the second convolutional layer. The second convolutional layer performs convolutional calculations on the received image data, and outputs the processed data to the third convolutional layer, and so on. The processes of the image data by the convolutional layers may be deemed as trunk processes, that is each convolutional layer performs the convolutional calculation on the image data only once. FIG. 2 is a schematic diagram of a method for processing a convolutional layer in a CNN in related art. FIG. 2 only shows six convolutional layers and does not show other layers in CNN. The six convolutional layers are arranged in sequence, and the convolutional processes are performed according to the arrangement order of the layers.

In the arrangement of the present disclosure, based on the target detection by the target detection module 21 using the CNN, that is, on the basis of the trunk processes, one or more convolutional layers may be selected from the plurality of convolutional layers in the CNN, and a branch convolutional process may be performed on the selected one or more convolutional layers by the branch convolutional module 22. FIG. 3 is a schematic diagram of a method for processing a convolutional layer in a target detection method according to an arrangement of the present disclosure. Based on the processes of the convolutional layers as shown in FIG. 2, for example, the branch convolutional processes are performed on the second and fourth convolutional layers, as shown in FIG. 3. As can be seen from FIG. 3, the convolutional calculations performed in turn for individual convolutional layers are regarded as the trunk processes, and the branch convolutional processes refer to that branch processes are added based on the trunk processes. As shown in FIG. 3, branch processes are performed on the second and fourth convolutional layers. In addition, the trunk processes generate only one result, that is, the detection result output by the last layer of the convolutional layers (the sixth convolutional layer in FIG. 3). The branch processes output a plurality of results. For example, the branch convolutional processes are performed on the two convolutional layers in FIG. 3, and if two parallel branch convolutional processes are performed on each of the two convolutional processes, four branch detection results are output, as shown in FIG. 3.

It should be noted that if the branch detection process is not performed on the last convolutional layer (the sixth layer in FIG. 3) in the CNN, the sixth convolutional layer still outputs the detection result of the trunk process; if the branch detection process is performed on the last convolutional layer in the CNN, only the branch detection result is output and the detection result of the trunk process of the six layer is no longer output. FIG. 4 is a schematic diagram of a method for processing a convolutional layer in a target detection method according to an arrangement of the present disclosure. The network structure of CNN shown in FIG. 4 is the same as that in FIG. 3, except that the second, fourth, and sixth (last layer) convolutional layers in FIG. 4 are subject to the branch convolutional processes, and under such condition, the sixth convolutional layer outputs only the branch detection result. In addition, in the processes shown in FIG. 3 and FIG. 4, the detection results including the branch processes are fused by a fusion process layer, and then transmitted to a fully connected layer. FIG. 2 shows two fully connected layers; however, this does not mean that the CNN in arrangements of the present disclosure necessarily includes two fully connected layers.

The fusion process module 23 is configured to perform a fusion process on the branch detection result, or performing a fusion process on the branch detection result and a detection result of the last convolutional layer in the convolutional neural network.

The transmission module 24 is configured to transmit a result of the fusion process to a fully connected layer.

In the processes of the convolutional layers in the CNN in related art as shown in FIG. 2, all convolutional layers output only one detection result, that is, the detection result generated by the convolution calculation of the last convolutional layer, so this detection result is directly transmitted to the fully connected layer. In the arrangement of the present disclosure, a plurality of branch detection results can be obtained by the branch convolutional module 22, and alternatively, one or more branch detection results are obtained by the branch convolutional module 22 and the detection result of the trunk processes may be acquired by the target detection module 21, and therefore, the fusion process is performed by the fusion process module 23 on multiple branch detection results or on at least one branch detection result and the detection result of the trunk processes. In this case, the detection results may be fused by the fusion process module 23. The fusion process refers to scaling multiple images of different sizes into uniform sizes. Therefore, the information of images can be integrated for target detection, and then the image data obtained after the fusion process is transmitted by the transmission module 24 to the fully connected layer.

As described above, whether the branch detection process is performed on the last convolutional layer in the CNN determines the number and contents of the detection results output by the CNN. Optionally, the convolutional layer on which the branch convolutional process is performed by the branch convolutional module 22 includes the last convolutional layer in the CNN, and the last convolutional layer only outputs the branch detection result, and no longer outputs the detection result of the trunk processes. Under such condition, the fusion process may include: performing the fusion process on each branch detection result of each convolutional layer on which the branch convolutional process is performed. Optionally, the convolutional layer on which the branch convolutional process is performed by the branch convolutional module 22 does not include the last convolutional layer in the CNN, and the last layer convolutional layer still outputs the detection result of the trunk processes. Under such condition, the fusion process includes: performing the fusion process on each branch detection result of each convolutional layer on which the branch convolutional process is performed and the detection result of the last convolutional layer in the CNN.

The processes of the convolutional layers in CNN in related art is as shown in FIG. 2, and there only exist the trunk processes. For example, in the CNN-based yolo algorithm, the yolo algorithm divides the entire image into grids of a fixed size (for example, 7*7, 3*3) in order to increase the speed, and two potential detection windows are obtained in each grid. The yolo algorithm is an end-to-end network model, image data is directly input, and the output is the detection result. The yolo algorithm maintains good detection accuracy, while having a fast detection speed. However, since the model of the yoo algorithm adopts a fixed network partitioning method, the detection accuracy for a small target (such as a pedestrian) is insufficient, and in the application scenario of pedestrian detection, the target tends to be relatively small in the image. Therefore, the yolo algorithm is difficult to detect small targets.

In view of the problem that the processing speed is slow and the small target is difficult to detect in the pedestrian detection in the existing CNN, arrangements of the present disclosure establishes a branch of the convolutional layers on the basis of the existing convolutional layers based on the VGG network architecture. That is, multiple branch detection results are obtained. Before transmitting the image data to the fully connected layer, the fusion processes is performed on the plurality of detection results (including at least one branch detection result and the detection result of the trunk processes, or including a plurality of branch detection results). That is, the obtained detection results include detection information of different scales, which makes the target detection method more applicable and can be applied to the target detection method for small targets.

In the target detection devices provided by the arrangements of the present disclosure, during the target detection performed by the target detection module using the CNN, the branch convolutional module obtains a branch detection result by performing a branch convolutional process on at least one convolutional layer in the CNN, and the fusion process module performs a fusion process on the branch detection result, or performs a fusion process on the branch detection result and the detection result of the last convolutional layer in the CNN, and the transmission module transmits the result after the fusion process to the fully connected layer. By the addition of the branch convolutional process(es), the convolutional process in the traditional CNN that includes only the trunk process is changed to the combination of the trunk process and the branch process, that is, the detection information of individual branches is added to the target detection. The target detection method provided by the arrangements of the present disclosure, based on the VGG network architecture, establishes the branches of the convolution layers on the basis of the existing convolutional layers, which makes the applicability of the target detection method more extensive, and solves the technical problem that the processing speed in the CNN-based pedestrian detection is low and it is hard to detect small targets.

Optionally, in an arrangement of the present disclosure, performing by the branch convolutional module 22 a branch convolutional process on at least one of the convolutional layers may include:

performing one or more parallel branch convolutional processes on each convolutional layer on which the branch convolutional process is performed. The numbers of branch convolutional processes for different convolutional layers are the same or different.

In the arrangement of the present disclosure, one or more parallel branch convolutional processes may be performed on one convolutional layer, or one or more parallel branch convolutional processes may be performed on multiple convolutional layers, or one branch convolutional process is performed on a part of the convolutional layers, and multiple parallel branch convolutional processes are performed on the other part of the convolutional layers. In a specific implementation, which convolutional layers in the CNN are selected as the layers subjected to the branch convolutional process(es), and which selected convolutional layer(s) is(are) subjected to one branch convolutional process, which selected convolutional layer(s) is(are) subjected to multiple parallel processes, can be configured by the designer. For example, in the processing mode shown in FIG. 3, the second and fourth convolutional layers are subjected to the branch convolutional processes, and each of the second and fourth convolutional layers is subjected to two parallel processes. For example, in the processing mode shown in FIG. 4, the second, fourth, and sixth convolutional layers are subjected to the branch convolutional processes, and one branch convolutional process is performed on the fourth convolutional layer, and two parallel branch convolutional processes are performed on the second and sixth convolutional layers.

In practical applications, sizes of convolution kernels used in the branch convolutional processes for different convolutional layers are the same or different, and sizes of the convolution kernels used when performing multiple parallel branch convolutional processes on the same convolutional layer are the same or different. In the arrangement of the present disclosure, the size of the convolution kernel used in each branch convolutional process may be configured by a designer according to actual conditions. For example, in the processing method shown in FIG. 3, the convolution kernels used in the two branch processes for the second convolutional layer are 2*3 and 4*5, respectively, and the convolution kernels used in the two branch processes for the fourth convolutional layer are 3*5 and 5*7, respectively. For example, in the processing method shown in FIG. 4, the convolution kernels used in the two branch processes for the second and sixth convolutional layers are 3*5 and 5*7, respectively, and the convolution kernels used in the one branch process for the fourth convolutional layer is 3*5 and 5*7.

Optionally, in the arrangement of the present disclosure, performing by the branch convolutional module 22 the branch convolutional process on the at least one convolutional layer may include: performing the branch convolutional process on at least one of the convolutional layers using a convolution kernel of n*m. It has been explained in the above arrangements that the size of the convolution kernel is configurable when the branch convolutional process is performed. If the target detection is required for the pedestrian, in the convolution kernel n*m that can be configured, n<m, n and m are positive integers. Such configuration is more in line with the detection size of pedestrians.

The sizes of the convolution kernels as described above are provided. In the arrangements of the present disclosure, the dividing of the grids when the convolutional processes are performed is improved for pedestrians (pedestrians are particular targets). That is, the sizes of the convolution kernels are no longer fixed as in the conventional mode, which makes the target detection method more suitable for detecting pedestrians.

It should be noted that the CNN includes not only multiple convolutional layers but also multiple pooling layers, which are arranged after different convolutional layers and are spaced from each other. For example, in the processing modes as shown in FIG. 3 and FIG. 4, a pooling layer may be provided after each of the third, fifth, and sixth layers (the pooling layers are not shown in the figure), and the pooling layers are spaced apart in the middle of the continuous convolutional layers, and are mainly used for compressing image data. Therefore, when performing the branch convolutional processes on multiple convolutional layers in the arrangements of the present disclosure, the plurality of convolutional layers that are usually selected are located between different pooling layers in the CNN, that is, multi-scale branches are added in the target detection, and different convolutional layers perform multi-scale detection. That is, the convolutional layers on which the branch convolutional processes are performed have different resolutions, and detection can be performed separately for targets of different sizes. In addition, in branches of different scales, the sizes of the convolution kernels can be configured according to different targets detected. That is, through multiple grids of different scales, the application range of the target detection device is further improved.

Figure 7:
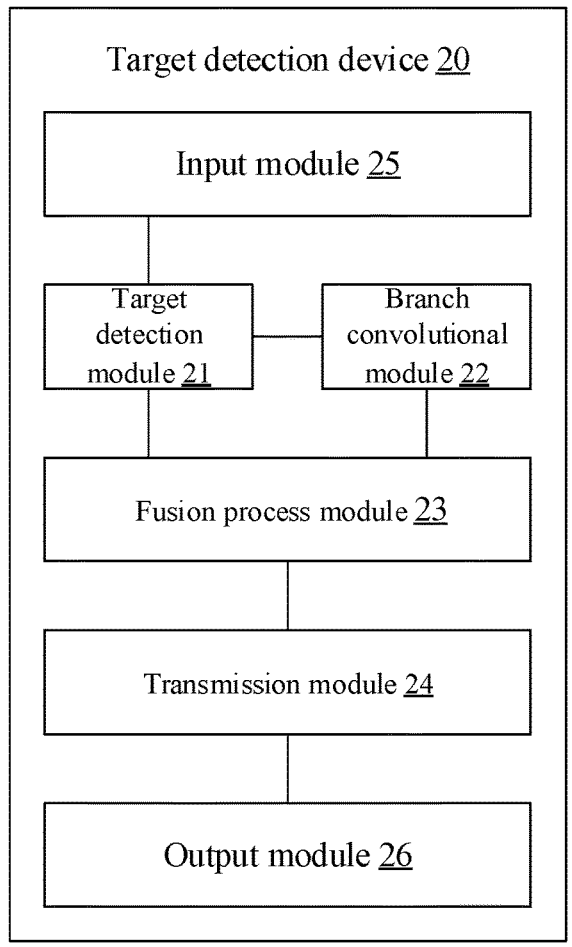
FIG. 7 is a schematic structural diagram of a target detection device according to an arrangement of the present disclosure.

FIG. 7 is a schematic structural diagram of a target detection device according to an arrangement of the present disclosure. On the basis of the structure of the device as shown in FIG. 6, the device provided by the arrangement may further include an input module 25 and an output module 26.

The input module 25 is configured to input an original image on which a target detection is to be performed.

The output module 26 is configured to output a target detection result which is processed by the fully connected layer.

Optionally, in the arrangements of the present disclosure, the CNN may be a VGG network. The configuration of the VGG network is as shown in Table 1 as described in the above arrangements. There are six configurations (i.e., configuration A to configuration E). The convolutional layers, the pooling layers and the fully connected layers for each configured are listed in detail in Table 1.

The VGG network architecture is taken as an example to describe the implementations of the target detection methods performed by the target detection devices provided by the arrangements of the present disclosure. Referring to FIG. 5 again, a configuration D in the VGG network is taken as an example. The configuration D is a 16-layer configuration (including 13 convolutional layers and 3 fully connected layers), hereinafter referred to as VGG-16.

In this example, performing by the branch convolutional module 22 the branch convolutional process on at least one convolutional layer may include:

performing two parallel branch convolutional processes on the seventh, the tenth, and the thirteenth convolutional layers in the VGG-16, respectively; wherein the convolution kernels used in the two parallel branch convolutional processes on the seventh, the tenth, and the thirteenth convolutional layers are 3*5 and 5*7, respectively. In the processing mode shown in FIG. 5, VGG-16 is used as the main frame of the network, and the first 13 convolutional layers of VGG-16 are used as the backbone of the network, and network branches are established in different convolutional layers, that is, the branch convolutional process is performed at the 7th, 10th and 13th convolutional layers to add multi-scale branches. And, the 3 layers are between different pooling layers and have different resolutions, so that it is possible to separately detect targets with different sizes, and thus to achieve the purpose of multi-scale detection. In addition, for the shape characteristics of pedestrians, the two grid-dividing methods of 3*5 and 5*7 are adopted, and the detection results of different branches are integrated through the fusion process, and finally transmitted to the fully connected layer to obtain the final result of the target detection.

It should be noted that the processes above are provided to provide exemplary implementations of the target detection devices provided by the arrangements of the present disclosure by using the network architecture of the VGG-16 as an example, and the target detection method is not limited to that the branch convolutional process is only performed on the 7th, 10th, and 13th convolutional layers, and it is not necessary to perform the processes by the three fully connected layers after the fusion process.

It should be noted that, in the process modes shown in FIG. 3 to FIG. 5 of the present disclosure, which convolutional layers in the CNN are subjected to the branch convolutional process, the size of the convolution kernel used in the branch convolutional process, and the specific configuration selected in the VGG network and the specific manner of implementing the target detection method in the selected configuration are illustrative.

Based on the target detection methods provided by arrangements of the present disclosure, arrangements of the present disclosure also provide target detection devices, which are configured to implement the target detection method according to any one of the above arrangements.

Figure 8:
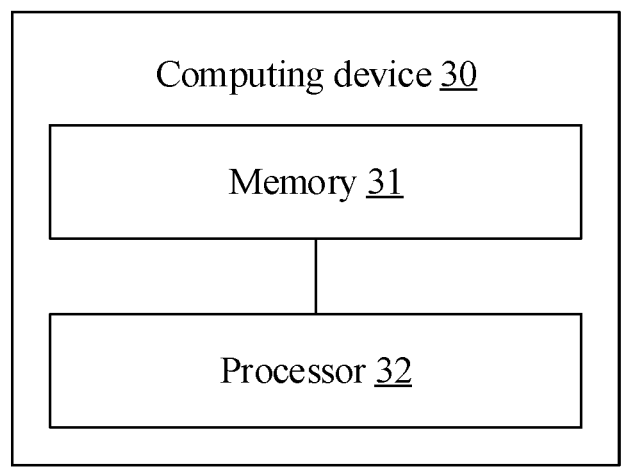
FIG. 8 is a schematic structural diagram of a computing device according to an arrangement of the present disclosure.

FIG. 8 is a schematic structural diagram of a computing device according to an arrangement of the present disclosure. The computing device 30 provided by the arrangement may include a memory 31 and a processor 32.

The memory 31 is configured to store executable instructions.

The processor 32 is configured to execute the executable instructions stored in the memory 32 to implement the target detection method according to any one of the above described arrangements.

The implementations of the computing device 30 provided by the arrangement of the present disclosure is substantially the same as the target detection methods provided by the foregoing arrangements of the present disclosure, and details are not described herein.

An arrangement of the present disclosure further provides a computer readable storage medium, which stores executable instructions. The executable instructions are executed by a processor to implement the target detection method according to any one of the above arrangements of the present disclosure. The implementations of the computer readable storage medium provided by the arrangement of the present disclosure is substantially the same as the target detection methods provided by the foregoing arrangements of the present disclosure, and details are not described herein.

While the arrangements of the present disclosure have been described above, the described arrangements are merely for the purpose of facilitating understanding of the present disclosure and are not intended to limit the present disclosure. Any modification and variation in the form and details of the arrangements may be made by those skilled in the art without departing from the spirit and scope of the present disclosure. The scope of the present disclosure is defined by the appended claims.

What is claimed is:

1. A target detection method, comprising:
performing target detection using a convolutional neural network comprising a plurality of convolutional layers;
performing trunk processes on individual ones of the plurality of convolutional layers in sequence, and performing a branch convolutional process on at least one of the plurality of convolutional layers to obtain a branch detection result;
performing a fusion process on the branch detection result, or on the branch detection result and a detection result of a last convolutional layer in the convolutional neural network which is generated based on a trunk process of the last convolutional layer; and
transmitting a result of the fusion process to a fully connected layer.

2. The target detection method according to claim 1, wherein performing the branch convolutional process on the at least one of the plurality of convolutional layers comprises:

performing one or more parallel branch convolutional processes on each convolutional layer on which the branch convolutional process is performed, wherein respective numbers of branch convolutional processes for different convolutional layers are the same or different; and wherein respective sizes of convolution kernels used in the branch convolutional processes for different convolutional layers are the same or different, and respective sizes of the convolution kernels used when performing multiple parallel branch convolutional processes on a same convolutional layer are the same or different.

3. The target detection method according to claim 1, wherein the at least one of the plurality of convolutional layers on which the branch convolutional process is performed comprises the last convolutional layer in the convolutional neural network; and wherein performing the fusion process comprises performing the fusion process on a respective branch detection result of each of the plurality of convolutional layers on which the branch convolutional process is performed.

4. The target detection method according to claim 1, wherein the convolutional layer on which the branch convolutional process is performed dose not comprise the last convolutional layer in the convolutional neural network;

wherein performing the fusion process comprises performing the fusion process on a respective branch detection result of each of the plurality of convolutional layers on which the branch convolutional process is performed and the detection result of the last convolutional layer in the convolutional neural network.

5. The target detection method according to claim 1, wherein the convolutional neural network further comprises a plurality of pooling layers which are disposed after different convolutional layers and are spaced from each other.

6. The target detection method according to claim 1, wherein performing the branch convolutional process on the at least one of the plurality of convolutional layers, comprises: performing the branch convolutional process on the at least one of the plurality of convolutional layers using a convolution kernel of n*m, where n<m, and n and m are positive integers.

7. The target detection method according to claim 1, wherein the convolutional neural network is a VGG network.

8. The target detection method according to claim 7, wherein the VGG network is configured as a 16-layer VGG-16;

wherein performing the branch convolutional process on at least one of the convolutional layers, comprises: performing two parallel branch convolutional processes on a seventh convolutional layer, a tenth convolutional layer, and a thirteenth convolutional layer in the VGG-16, respectively; and wherein convolution kernels used in the two parallel branch convolutional processes on the seventh, the tenth, and the thirteenth convolutional layers are 3*5 and 5*7, respectively.

9. A system, comprising:

at least one computing device comprising a memory and at least one hardware processor; and executable instructions stored in the memory that, when executed by the at least one hardware processor, direct the at least one hardware processor to:

perform target detection using a convolutional neural network comprising a plurality of convolutional layers;

perform trunk processes on individual ones of the plurality of convolutional layers in sequence, and perform a branch convolutional process on at least one of the plurality of convolutional layers to obtain a branch detection result;

perform a fusion process on the branch detection result, or on the branch detection result and a detection result of a last convolutional layer in the convolutional neural network that is generated based on a trunk process of the last convolutional layer; and transmit a result of the fusion process to a fully connected layer.

10. The system according to claim 9, wherein the at least one hardware processor is further directed to:

perform one or more parallel branch convolutional processes on each of the plurality of convolutional layers on which the branch convolutional process is performed, wherein respective numbers of branch convolutional processes for different convolutional layers are the same or different; and wherein respective sizes of convolution kernels used in the branch convolutional processes for different convolutional layers are the same or different, and respective sizes of the convolution kernels used when performing multiple parallel branch convolutional processes on a same convolutional layer are the same or different.

11. The system according to claim 9, wherein the at least one of the plurality of convolutional layers on which the branch convolutional process is performed comprises the last convolutional layer in the convolutional neural network; and the at least one hardware processor is further directed to perform the fusion process on a respective branch detection result of each of the plurality of convolutional layers on which the branch convolutional process is performed.

12. The system according to claim 9, wherein the at least one of the plurality of convolutional layers on which the branch convolutional process is performed dose not comprise the last convolutional layer in the convolutional neural network; and wherein the at least one hardware processor is further directed to perform the fusion process on a respective branch detection result of each of the plurality of convolutional layers on which the branch convolutional process is performed and the detection result of the last convolutional layer in the convolutional neural network.

13. The system according to claim 9, wherein the convolutional neural network further comprises a plurality of pooling layers which are disposed after different convolutional layers and are spaced from each other.

14. The system according to claim 9, wherein the at least one hardware processor is further directed to: perform the branch convolutional process on the at least one of the plurality of convolutional layers using a convolution kernel of n*m, where n<m and n and m are positive integers.

15. The system according to claim 9, wherein the convolutional neural network is a VGG network.

16. The system according to claim 15, wherein the VGG network is configured as a 16-layer VGG-16;

wherein the at least one hardware processor is further directed to: perform two parallel branch convolutional processes on a seventh convolutional layer, a tenth convolutional layer, and a thirteenth convolutional layer in the VGG-16, respectively; and wherein convolution kernels used in the two parallel branch convolutional processes on the seventh, the tenth, and the thirteenth convolutional layers are 3*5 and 5*7, respectively.

17. A non-transitory computer-readable storage medium having executable instructions stored thereon that, when executed by at least one hardware processor, direct the at least one hardware processor to implement a target detection method, wherein the target detection method comprises:

performing target detection using a convolutional neural network comprising a plurality of convolutional layers;

performing trunk processes on individual ones of the plurality of convolutional layers in sequence, and performing a branch convolutional process on at least one of the convolutional layers to obtain a branch detection result;

performing a fusion process on the branch detection result, or on the branch detection result and a detection result of a last convolutional layer in the convolutional neural network which is generated based on a trunk process of the last convolutional layer; and transmitting a result of the fusion process to a fully connected layer.

* * * * *